Feb. 9, 1926.
F. E. SMITH
1,572,818
DRIVE MECHANISM
Filed March 26, 1925     3 Sheets-Sheet 1
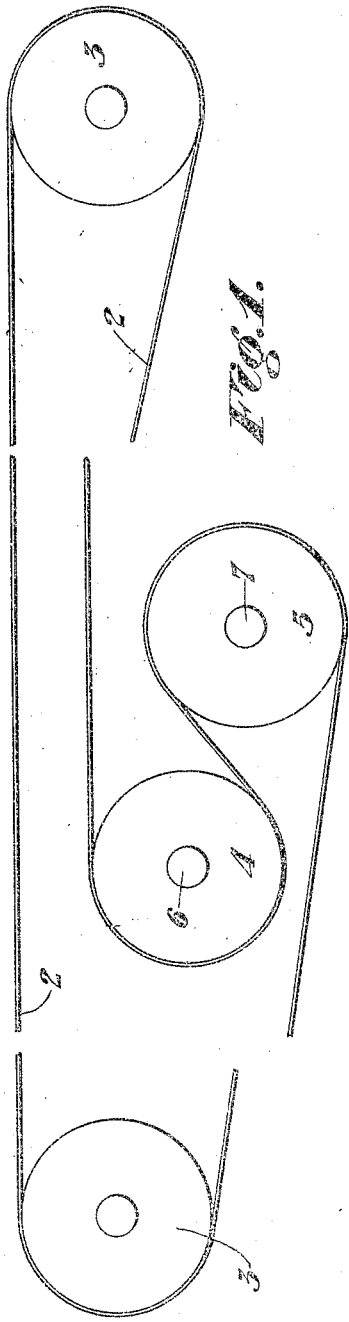
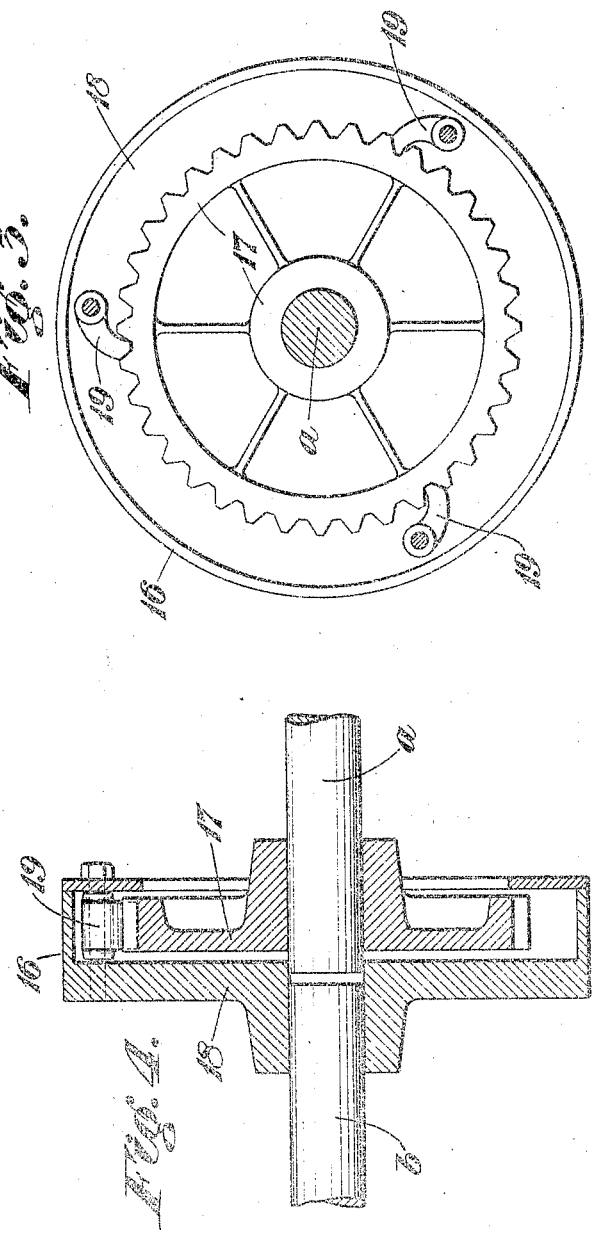
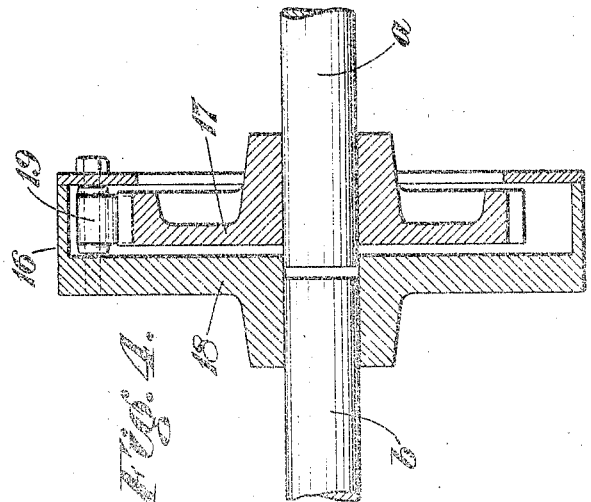
Witnesses:
Edwin Trueb
Inventor:
FRANK E. SMITH,
by D. Anthony Usina
his Attorney.

Feb. 9, 1926.

F. E. SMITH 1,572,818

DRIVE MECHANISM

Filed March 26, 1925   3 Sheets-Sheet 2

Witnesses:
Edwin Trueb

Inventor:
FRANK E. SMITH,
by
his Attorney.

Feb. 9, 1926.
F. E. SMITH
DRIVE MECHANISM
Filed March 26, 1925
1,572,818
3 Sheets-Sheet 3
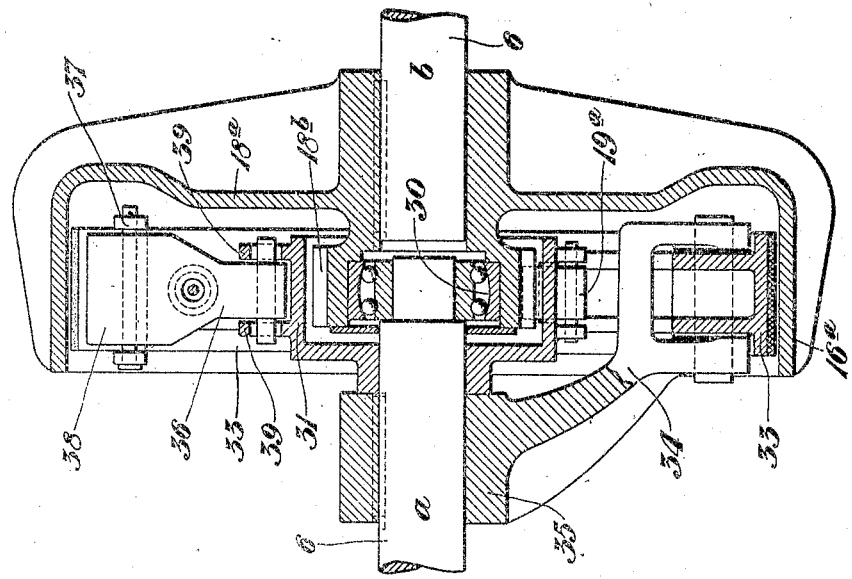
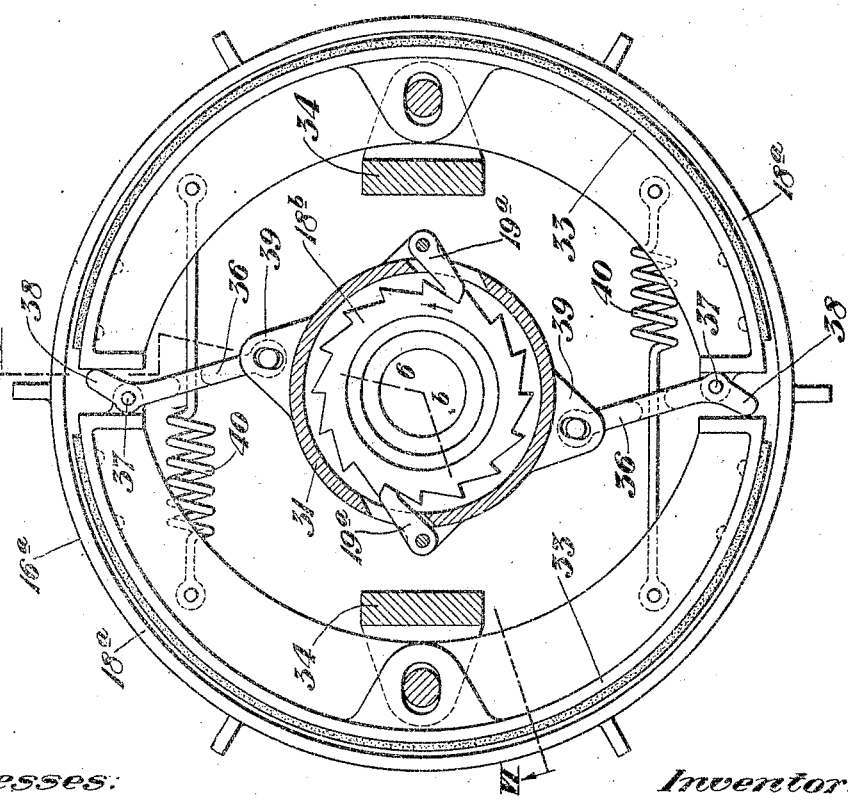
Witnesses:
Edwin Trueb
Inventor:
FRANK E. SMITH,
by D. Anthony Usina
his Attorney.

Patented Feb. 9, 1926.

1,572,818

UNITED STATES PATENT OFFICE.

FRANK E. SMITH, OF SCOTTDALE, PENNSYLVANIA.

DRIVE MECHANISM.

Application filed March 26, 1925. Serial No. 18,539.

*To all whom it may concern:*

Be it known that I, FRANK E. SMITH, a citizen of the United States, and resident of Scottdale, in the county of Westmoreland and State of Pennsylvania, have invented certain new and useful Improvements in Drive Mechanisms, of which the following is a specification.

This invention relates to drive mechanism for endless conveyers and more particularly to tandem drive pulleys for endless belt conveyers, and has for its object the provision of such a drive in which one of the pulleys of the tandem drive will function as a drive pulley only when the conveyer belt slips on the other pulley, and which will normally function as an idler pulley.

Another object is to provide such a tandem drive with means for automatically forming a positive drive connection between a source of power and the pulley normally functioning as an idler pulley when the belt slips on the other pulley.

A further object is to provide a tandem drive for belt conveyers having the novel arrangement, construction and combination of parts hereinafter described and illustrated in the following drawings.

In the drawings:

Figure 1 is a somewhat diagrammatic elevation of a conveyer embodying my invention.

Figure 3 is a side elevation of the ratchet coupling.

Figure 4 is a sectional elevation of the ratchet coupling.

Figure 5 is a sectional elevation showing a modified form of construction.

Figure 6 is a sectional elevation on the line VI—VI of Figure 5.

Figure 2:
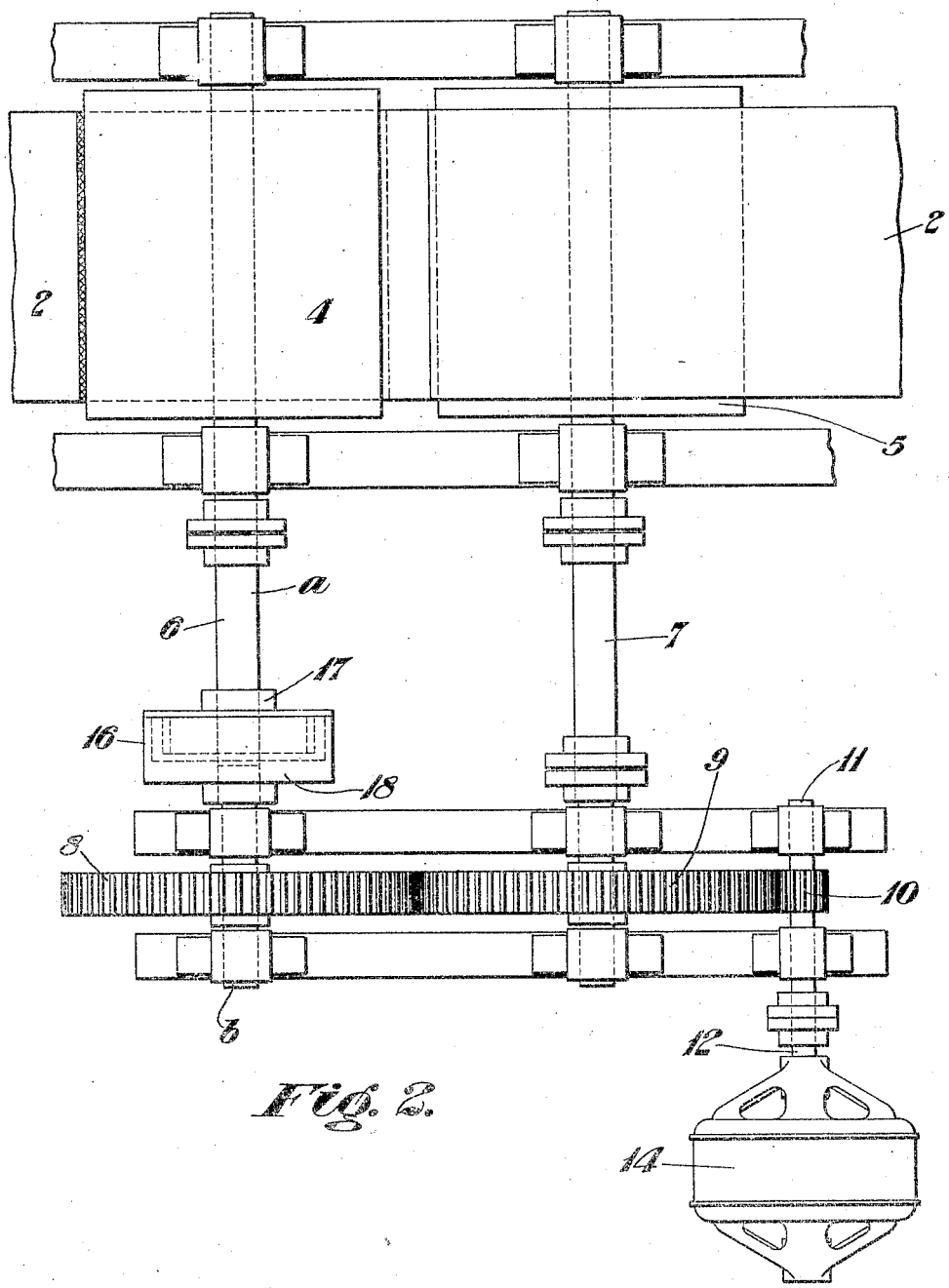
Figure 2 is an enlarged plan of the tandem drive embodying my invention.

Referring more particularly to the drawings, the numeral 2 designates the conveyer belt which is trained around suitable idler pulleys 3 at the ends of the conveyer, and tandem drive pulleys 4 and 5 intermediate the ends of the conveyer. While not shown, it will be understood that suitable supporting rollers may be provided along the length of the conveyer to support the conveyer belt.

The tandem drive pulley 4 is preferably made of slightly less diameter than the pulley 5 so when power is applied to the pulley 5 and the belt 2 started in motion the pulley 4 will travel at a greater R. P. M., providing the belt does not slip, than the pulley 5.

The pulleys 4 and 5 are mounted on drive shafts 6 and 7, respectively, which are geared together by gears 8 and 9, and the gear 9 is in mesh with a pinion 10 on a power shaft 11 connected with the armature shaft 12 of a motor 14. The gears 8 and 9 are equal so that if there was no intervening mechanism the shafts 6 and 7 and pulleys 4 and 5 would be compelled to rotate at the same speed, and the belt 2 would be compelled to constantly slip on the pulley 4.

In the present construction, however, I have divided the drive shaft 6 for the pulley 4 forming an idler portion *a*, and a drive portion *b*, and connected said portions by a ratchet coupling 16.

The ratchet coupling 16 comprises a ratchet wheel member 17 fixedly mounted on the idler portion *a*, of the shaft 6, and a housing member 18 fixedly mounted on the drive portion *b*, of the shaft 6, and freely supporting the end of the portion *a* of the shaft. The housing 18 fits around the ratchet wheel 17 and has a plurality of dog members 19 pivotally mounted therein and adapted to engage the teeth of the ratchet wheel 17.

In operation, when the motor 14 is set in motion the shaft 7 and pulley 5 and the drive portion *b*, of the shaft 6, will be rotated at equal speeds, and if the belt 2 did not slip, the pulley 4 and portion *a*, of the shaft 6, would be rotated at a slightly greater speed than the pulley 5, shaft 7 and portion *b* of the shaft 6, due to its smaller diameter. However, due to the starting load, the belt 2 will slip on the pulley 5, and the pulley will therefore tend to rotate at a greater speed than the pulley 4. When the pulley 4 and portion *a*, of the shaft 6, tend to rotate at a lesser speed than the positively driven members, the ratchet coupling 16 will act as a positive coupling since the dogs 19 will engage the teeth of the ratchet wheel 17, therefore, the pulley 4 will be positively driven at the same R. P. M. as the pulley 5. After the belt 2 has been set in motion the slip on the pulley 5 will diminish and finally stop, whereupon the pulley 4 and portion *a* of its shaft will rotate at a greater R. P. M.

than the pulley 5, shaft 7 and portion b, of shaft 6, and the ratchet wheel 17 will ride past the dogs 19, therefore rendering the coupling 16 inoperative as a drive connection.

In Figures 5 and 6 I have shown a modified form of coupling 16ª for the drive shaft 6. In this construction the drive portion b, of the shaft 6, is provided with a housing member 18ª which is keyed thereto. A ratchet ring 18ᵇ is formed integral with the housing 18ª and its inner surface forms a support for the end of the portion a of the shaft 6. The end of the portion a, of the shaft 6, is provided with an anti-friction bearing 30 which fits within the ring 18ᵇ. A suitable dog carrying ring 31 is mounted for free rotation on the portion a, of the shaft 6, and is of such size as to fit around the ratchet ring 18ᵇ in spaced relation. Suitable dogs 19ª are carried by the ring 31 and are adapted to engage the teeth of the ratchet ring 18ᵇ.

A suitable clutch shoe formed in two semi-circular segments 33 is mounted within the housing 18ª and adapted to engage the inner periphery thereof, to form a drive connection. The shoe segments 33 are each pivotally mounted on the arms 34 of a supporting yoke 35 keyed on the shaft portion a, of the shaft 6. The segments 33 are connected and normally tensioned toward each other in collapsed position by springs 40.

Cam levers 36 are pivotally mounted on the ends of the shoe segments 33 as at 37, and have their cam heads 38 arranged so as to force the segments apart and into contact with the inner periphery of the housing 18ª when said levers are rocked in one direction about their pivotal mountings 37. The lower ends of the levers 36 are pivotally connected to suitable projections 39 on the ring 31.

The operation of this clutch is substantially the same as the preferred form with the exception that it will be smoother in its action.

When the motor 14 is set in motion the shaft 7 and pulley 5 and the drive portion b, of the shaft 6, will be rotated at equal speeds, and if the belt 2 did not slip, the pulley 4 and portion a, of the shaft 6, would be rotated at a slightly greater speed than the pulley 5, shaft 7 and portion b of the shaft 6, due to its smaller diameter. However, due to the starting load, the belt 2 will slip on the pulley 5, and the pulley 5 will therefore tend to rotate at a greater speed than the pulley 4, which is driven by the belt 2. When the pulley 4 and portion a, of the shaft 6, tend to rotate at a lesser speed than the positively driven members, the ratchet ring 18ᵇ will engage the dogs 19ª on the ring 31, thereby rotating the ring 31 so as to operate the cam levers 36 and expand the clutch shoe segments 33 into engagement with the housing 18ª and form a drive connection between shaft parts a and b. After the belt 2 has been set in motion, the slip on the pulley 5 will diminish and finally stop, whereupon the pulley 4 and portion a, of its shaft 6, will rotate at a greater R. P. M. than the pulley 5 and the positive driven elements due to its smaller diameter and the release of the coupling 16ª. When the pulley 4 is rotated by the belt 2 at a greater R. P. M. than the normal driving speed induced by the motor 14, the shaft portion a will rotate the clutch shoe segments 33, cam levers 36, ring 31 and dogs 19ª relative to the housing 18ª and ratchet ring 18ᵇ, thereby releasing the shoe segments 33 from engagement with the housing 18ª and permits the pulley 4 to rotate free of the motor driven portion b, of the shaft 6.

The advantages of this construction will be readily appreciated by those skilled in the art. By this construction, or its equivalent, all the advantages of a tandem drive are obtained for starting or on extra loads, while under normal operation the advantages of a single drive pulley are obtained.

While I have shown and described one specific embodiment of my invention, it will be understood that I do not wish to be limited thereto since various modifications may be made without departing from the scope of my invention as described in the appended claims.

I claim:

1. The combination with an endless conveyer of tandem drive pulleys over which said conveyer is trained, one of said pulleys being of a slightly smaller diameter than the other so as to normally compel a faster rotation to equal the surface speed of the larger pulley, drive shafts for said pulleys, the drive shaft for said smaller diameter pulley being divided intermediate its ends forming a drive portion and an idler portion, a source of power having a geared connection with the drive shaft of the larger diameter pulley and the drive portion of the drive shaft for the smaller diameter pulley so as to positively drive said larger diameter pulley and said drive portion of the smaller diameter pulley drive shaft at the same speed, and a coupling connecting the drive and idler portions of the drive shaft for said smaller diameter pulley, said coupling being adapted to permit free rotation of said smaller diameter pulley and idler portion of said smaller diameter pulley drive shaft relative to said drive portion at a greater speed than said drive portion of said shaft, and to automatically form a drive connection between said drive and idler portions of said shaft when said smaller diameter pulley tends to rotate at a lesser speed than said drive portion of its drive shaft.

2. The combination with an endless conveyer of tandem drive pulleys over which said conveyer is trained, drive shafts for said pulleys, the shaft for one of said pulleys having a geared connection with a source of power forming a positive drive, the other of said drive shafts being divided intermediate its ends, one portion of said second named shaft having a geared connection with a source of power forming a positive drive, a coupling connecting the other portion of said second named shaft with said first named portion, and means in said coupling for automatically forming a positive connection between said shaft portion when said second named portion tends to rotate at a lesser speed than said first named portion.

3. The combination with an endless conveyer of tandem drive pulleys over which said conveyer is trained, drive shafts for said pulleys, the shaft for one of said pulleys having a geared connection with a source of power forming a positive drive, the other of said drive shafts being divided intermediate its ends, one portion of said second named shaft having a geared connection with a source of power forming a positive drive, and a ratchet coupling connecting the other portion of said second named shaft with said first named portion, said coupling comprising a ratchet wheel member secured to said second named portion of said shaft, a housing secured to said first named portion of said shaft, and dog members carried by said housing and adapted to automatically engage with said ratchet wheel and form a positive connection between said shaft portions when said second named portion tends to rotate at a lesser speed than said first named portion.

4. The combination with an endless conveyer of tandem drive pulleys over which said conveyer is trained, one of said pulleys being of a slightly smaller diameter than the other, drive shafts for said pulleys, the drive shaft for said smaller diameter pulley being divided intermediate its ends forming a drive portion and an idler portion, means for driving the drive shaft of the larger diameter pulley and the drive portion of the drive shaft for the smaller diameter pulley at substantially the same speed, and means for automatically forming a positive drive between the drive and idler portions of the drive shaft for said smaller diameter pulley when said pulley tends to rotate at a lesser speed than said drive portion of said shaft.

5. The combination with an endless conveyer of tandem drive pulleys over which said conveyer is trained, one of said pulleys being of a slightly smaller diameter than the other, drive shafts for said pulleys, the drive shaft for said smaller diameter pulley being divided intermediate its ends forming a drive portion and an idler portion, means for driving the drive shaft of the larger diameter pulley and the drive portion of the drive shaft for the smaller diameter pulley at substantially the same speed, and a coupling connecting the drive and idler portions of the drive shaft for said smaller diameter pulley, and means in said coupling for automatically forming a positive connection between said shaft portions when said smaller diameter pulley tends to rotate at a lesser speed than said drive portion of its drive shaft.

6. The combination with an endless conveyer of tandem drive pulleys over which said conveyer is trained, one of said pulleys being of a slightly smaller diameter than the other, drive shafts for said pulleys, the drive shaft for said smaller diameter pulley being divided intermediate its ends forming a drive portion and an idler portion, means for driving the drive shaft of the larger diameter pulley and the drive portion of the drive shaft for the smaller diameter pulley at substantially the same speed, and a ratchet coupling connecting the drive and idler portions of the drive shaft for said smaller diameter pulley, said coupling comprising a ratchet wheel member secured to said idler portion of said shaft, a housing secured to said drive portion of said shaft, and dog members mounted in said housing and adapted to automatically engage with said ratchet wheel and form a positive drive connection between the drive and idler portions of said shaft when said smaller diameter pulley tends to rotate at a lesser speed than the drive portion of its shaft.

In testimony whereof I have hereunto set my hand.

FRANK E. SMITH.